United States Patent [19]

Takeno

[11] Patent Number: 4,626,872

[45] Date of Patent: Dec. 2, 1986

[54] THERMAL PRINT HEAD

[75] Inventor: Shozo Takeno, Yokohama, Japan

[73] Assignee: Kabushiki Kaisha Toshiba, Kawasaki, Japan

[21] Appl. No.: 770,562

[22] Filed: Aug. 29, 1985

[30] Foreign Application Priority Data

Oct. 5, 1984 [JP] Japan ............................... 59-208087

[51] Int. Cl.[4] ............................................ G01D 15/10

[52] U.S. Cl. .......................... 346/76 PH; 346/139 C; 219/543; 400/120

[58] Field of Search ............ 346/76 R, 76 PH, 139 C; 400/120; 219/216 PH, 543

[56] References Cited

U.S. PATENT DOCUMENTS 4,110,598 8/1978 Small .............................. 346/76 PH 4,236,163 11/1980 Iino .................................. 346/76 R

FOREIGN PATENT DOCUMENTS 2365204 12/1973 Fed. Rep. of Germany ... 346/76 PH 3021214 4/1980 Fed. Rep. of Germany ... 346/76 PH 57-131576 8/1982 Japan ............................. 346/76 PH

*Primary Examiner*—Arthur G. Evans

*Attorney, Agent, or Firm*—Oblon, Fisher, Spivak, McClelland, & Maier

[57] ABSTRACT

A thermal print head comprises a heat resisting resin film and resistive heating layers and metal circuit layers on the film, the metal circuit layers connected to the resistive heating layers respectively. The film is supported on a heat sink substrate provided with a flat surface and corner sections formed at the both sides of the flat surface, the resistive heating layers positioned over the flat surface. The heat sink substrate supports the film to prevent the resistive heating layers from electrical resistance value fluctuation due to bending of the film.

11 Claims, 6 Drawing Figures

THERMAL PRINT HEAD

BACKGROUND OF THE INVENTION

1. Field of the Invention

This invention relates to a thermal print head with resistive heating layers on a flexible organic resin film sheet.

2. Background of the Prior Art

Thermal print heads are installed in facsimile devices and the other similar recording devices. Advanced applications of such heads have presented needs for high precision and high speed recording of characters and images a thermally sensitive material, and compact heads for assembly in the various devices. Furthermore, in applications involving color printing apparatus which have a plurality of thermal heads for each color, the heads are required to exhibit thin widths to provide for parallel arrangement. Responding to such requirements, a rod type head structure provided with a metal member of circular or eliptical shape in cross-section was developed and coated with a glass glaze as illustrated in Japanese utility model laid-open No. 57-193545 and Japanese patent laid-open No. 58-92576. A resistive heating element array and metal circuit wiring connected thereto are therefore formed on the curved glass glaze surface. However, such a structure contains significant problems as follows: namely, the formation of the resitive heating film and metal circuit wiring usually use photo-etching technique, the technique comprising an exposure process including photo engraving with a photo resist mask on engraved film. To make the photo resist mask pattern, exposing light is projected on the photo resist layer through a pattern mask intimately contacted with or spaced apart from the resist layer. On exposure, if the distance between the mask pattern and photoresist layer is not constant for a portion of the exposed area, the high density pattern of resistive heating elements and metal circuit layers cannot be precisely formed. As a result, it is difficult to manufacture desired high quality thermal print heads.

To address the above problems, a flexible film type thermal print head has been proposed. The method of manufacturing comprises a first step of forming resistive heat layers on a flat flexible film and a second step of rolling and adhering the flexible film along a side surface of a rod substrate provided with a ridge. In practice, however, since the electrical resistance values of the resistive heating elements each, after adhering to the rod substrate, vary widely compared to the values before adhering, such thermal print heads cannot be practically manufactured.

SUMMARY OF THE INVENTION

It is an object of this invention to provide a thermal print head that can be easily manufactured with high density resistive heating layers and metal circuit layers.

It is another object of this invention to provide a thermal print head of high quality and compact size.

In accordance with one aspect of this invention, a thermal print head is provided with a heat sink substrate having a flat surface with corners extending along both sides of the surface. A heat resisting organic resin film sheet (hereinafter simply referred to as a film) is formed on the flat surface and folded at the corners. Heat resistive heating layers comprising a plurality of divided resistive heat elements are deposited on an area of the film over the flat surface. Metal circuit layers electrically connected to the resistive heating layers respectively extend on the film from the flat surface over the corners. At least one integrated circuit is mounted directly on the substrate or on the film and electrically connected to the metal circuit layers. The resistive heating layers are consequently kept flat, supported without bending.

DETAILED DESCRIPTION OF THE PREFERRED EMBODIMENT

Figure 1:
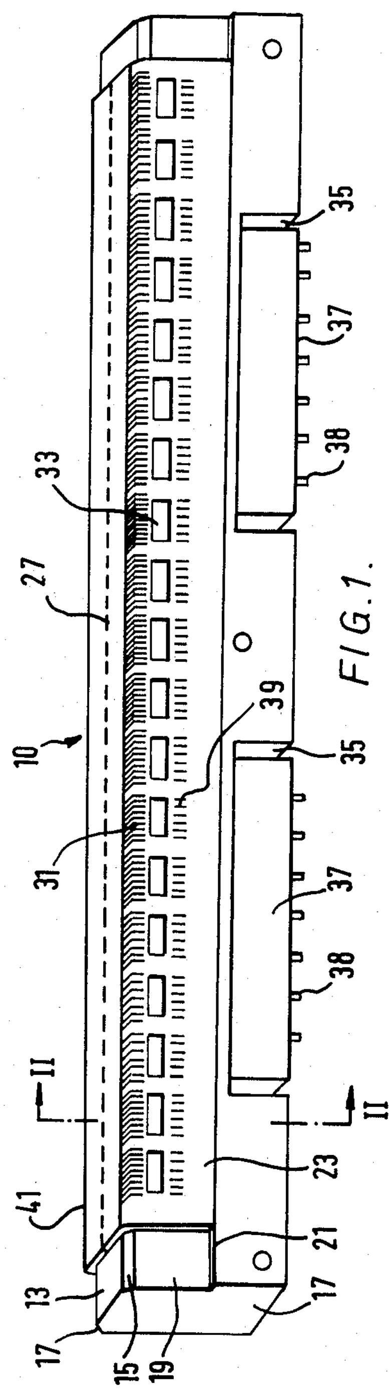
FIG. 1 is a perspective view of a thermal print head according to this invention.
Figure 3:
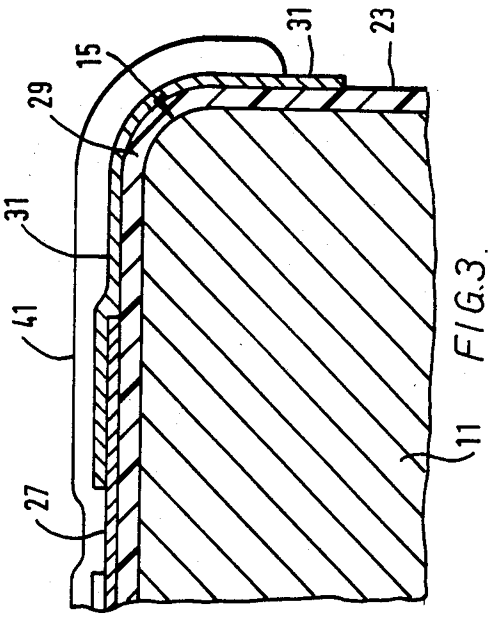
FIG. 3 is an enlarged partial cross sectional view of the thermal print head in FIG. 2.
Figure 2:
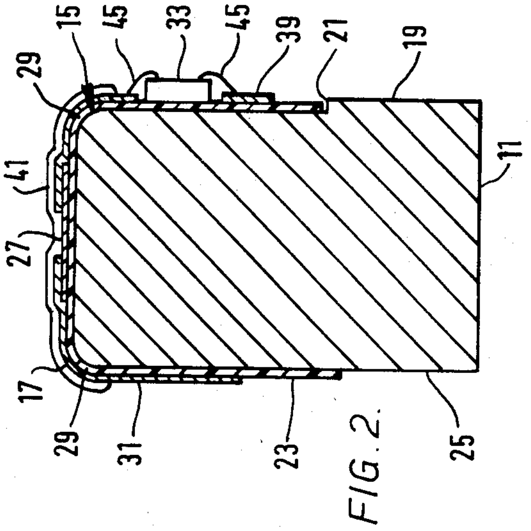
FIG. 2 is an enlarged cross sectional view of the thermal print head shown in FIG. 1 taken on the line II—II of FIG. 1.

Reference is now made to the drawings, wherein like reference numerals designate identical corresponding parts in each of embodiments. FIGS. 1 to 3 show a thermal print head 10 provided with a heat sink substrate 11 of a rod-shaped plate having a square cross section, of aluminum. One of the end surfaces of substrate 11 is a flat surface 13 polished to a high degree, containing rounded corners 15 and 17 along both sides of flat surface 13. On a side surface 19 of substrate 11, a step 21 is formed along the axis of substrate 11. A heat resisting organic resin film 23 of polyimide is formed on flat surface 13 and both side surfaces 19 and 25 of substrate 11, and folded at corners 15 and 17, so that an edge of film 23 is joined to step 21. On film 23, formed are resistive heating layers 27 comprising resistive elements, metal circuit layers 31 extending from an area of resistive heating layers 27 through folded sections 29 over corners 15 and 17, and semiconductor integrated circuits 33 electrically connected by bonding wires to metal circuit layers 31. On the end surface of substrate 11 opposite 13, cut portions 35 are formed, in which terminal boxes 37 are mounted. Outer metal circuit layers 39 are connected to terminals 38 of terminal boxes 37. A wear resisting layer 41 of di-tantalum pentoxide ($Ta_2O_5$) overcoats film 23, heat generating resistive layers 27 and metal circuit layers 31 on film 23 over flat surface 13. Layer 41 also may overcoat folded sections 29 of film 23.

Figure 4:
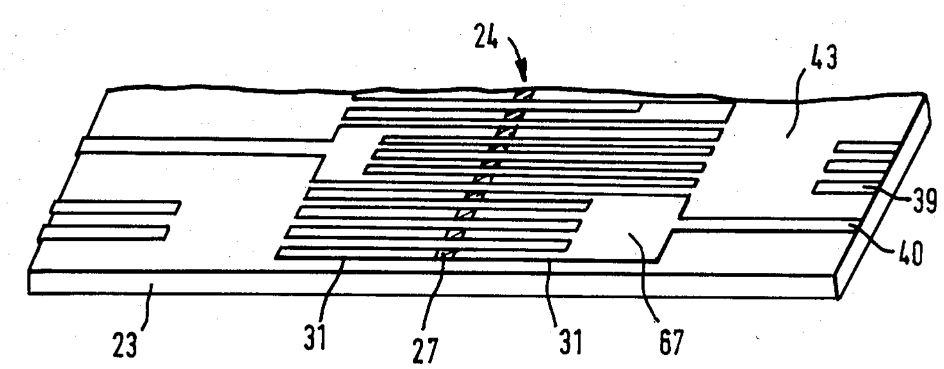
FIG. 4 is an enlarged perspective view of a heat resisting organic resin film illustrating the manufacturing process of the thermal print head of FIG. 1.

Refering to FIG. 4, described is manufacturing process of the thermal print head 10.

First, a flexible insulating organic resin film 23 of heat resisting polymer such as a polyimide with a thermal decomposition temperature of 600° C. is prepared.

Surfaces of film 23, are each a flat surface in average roughness of 2 to 20 μm. By the use of thin film technique i.e. evaporation, sputtering plasma chemical vapor deposition, photoetching and so on, on one surface of film 23 are deposited and patterned resistive heating layers 27 array divided into a plurality of heat resistive elements and metal circuit layers 31 connected to both ends of resistive heating layers 27 respectively, defining the length of resistive heat layers 27. Metal circuit layers 31 contain a common conductive layer 37, outer circuit layers 39 and terminal layers 40 connected to outer driver circuits. In FIG. 4, an area designated by the number 43 is a position at which integrated circuits 33 are mounted. Thus, a flexible circuit board 24 is obtained. Board 24 is intimately contacted with and fixed on flat surface 13 of substrate 11 and folded at corners 15 and 17 towards side surfaces 19 and 25.

Throughout the process, the film area deposited with resistive heating layers 27 is kept flat by tension means to avoid any bending and mechanical strain occurring unexpectedly in resistive heating layers 27. It has been ascertained by the comparison of distorted resistive layer with nondistorted resistive layers that resistance values of resistive layers after distortion were substantially increased and varied widely as follows; 100 pieces of Ta-Si-O film resistive elements in 0.3 $\mu$m thickness and dimension of 100 $\mu m \times 180$ $\mu$m were deposited on a polyimide film of 20 $\mu$m thickness by sputtering. The resistance values of these elements showed in $300\Omega \pm 3\%$.

The film was consequently adhered to a cylindrical metal substrate having a semi-diameter of 0.5 cm, and when values were measured, the resistance values varied to $600\Omega \pm 50\%$, widely deviating from the expected value.

It is therefore necessary that flexible film 23 be maintained on substrate 11 to preserve its flatness.

Therefore, the film area deposited with heating resistive layer 27 is positioned on flat surface 13 and the other film area patterned with metal circuit layers 31 may be folded at corners 15 and 17, extending through folded sections 29. Thereafter integrated circuit 33 driving resistive layers 27 is mounted on area 43 and its electrode pads are bonded to metal circuit layers 31 and 39 with bonding wires 45.

Finally a wear resisting layer 41 of $Ta_2O_5$of about 3 $\mu$m thickness is adhered on resistive heating layers 27 and adjacent areas and over folded film sections 29.

According to this embodiment, since resistive heating layers 27 and metal circuit layers 31 and 39 are formed on flexible organic resin film 23 while flatness is maintained, the thin film technique can be used to manufacture such elements and a thermal print head with high circuit density is established. Additionally, because surface 13 of substrate 11 is flat and supports film 23, resistive heating layers 27 on surface 13 are formed without bending, and are not folded or deformed. In consequence, such structures obtain the desired effect that resistance values of the resistive heating elements are kept constant.

Figure 5:
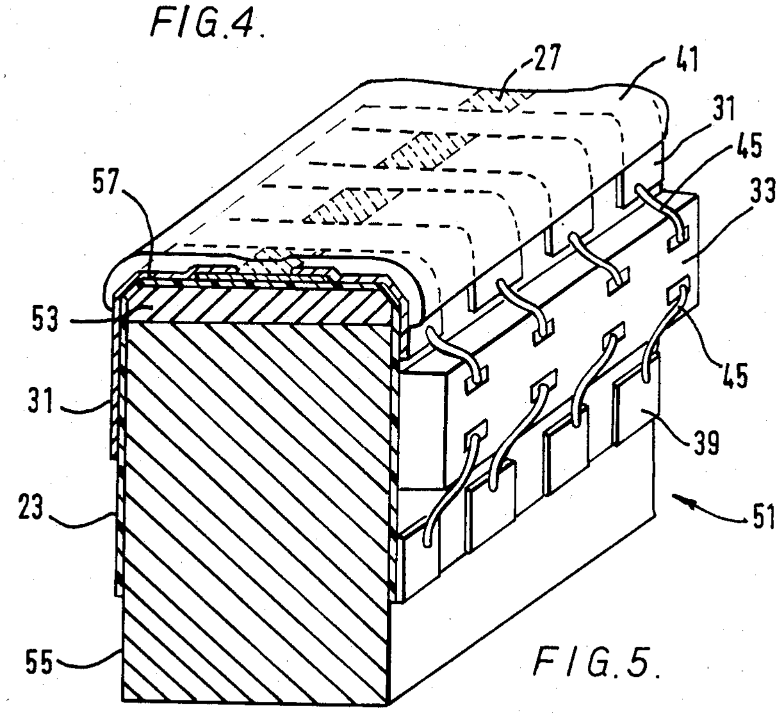
FIG. 5 is an enlarged partial perspective view of another embodiment of this invention.
Figure 6:
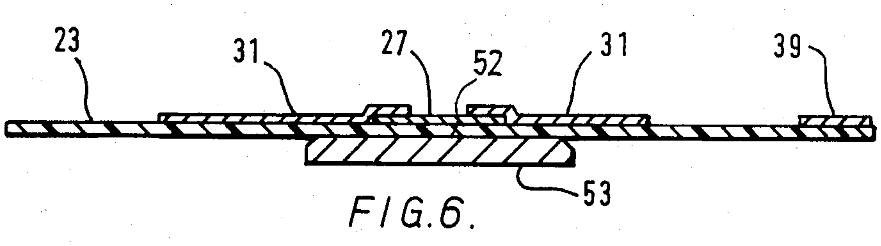
FIG. 6 is an enlarged sectional view of illustration of manufacturing process of the thermal print head showing in FIG. 5.

FIG. 5 shows another embodiment of the invention. A heat sink substrate 51 comprises flat metal plate 53 and metal block 55 having a square cross section, made of either copper or aluminum. Metal plate 53 is made from a planar sheet of 0.1 mm thickness or more to ensure hard ductility with a flat surface 57 having less than 20 $\mu$m roughness. After film 23 is fixed to metal plate 53, metal plate 53 and metal block 55 are united. As is described above, resistance values of resistive heating layers 27 are changed by bending or folding film 23 in the area below deposited resistive heating layers 27. Accordingly, it is important that the flatness of the film and resistive heating layers 27 is maintained throughout the whole process. This embodiment easily keeps the flatness constant. In FIG. 6, a sheet-like aluminum plate 0.2 mm in thickness with a flat surface 52 is prepared for metal plate 53. On surface 52 heat resisting insulating film 23 of polyimide resin is adhered so as to exclude any air therebetween, and to ensure that all portions of film 23 are firmly adhered to surface 52. If an area is not adhered or standing air remains, these may prevent heat dispersion from resistive heating layers 27 to substrate 51 and sacrifice the uniform thermal sensitive operation of the resistive heating layers.

Subsequently, by thin film techniques, a Ta-Si-O film is deposited on surface 52 at room temperature by sputtering with use of a sintered target of tantalum and silicon oxide. Thereafter a metal layer of chrome and gold is evaporated onto the film. These materials are then coated with a photoresist, exposed and developed, leaving an etchresistant pattern of photoresist where desired. The remaing materials are etched and then resistive heating layers 27 are divided into a plurality of heat resistive elements of a predetermined pattern, and metal circuit layers 31 and 39 are formed. Since film 23 is in a flat state through the process, thin film techniques such as photo etching are effective, and as a result high density arrangements of resistive heating elements with resolution of more than 16 dots per mm are realized. The circuit board obtained is mounted on metal block 55 as shown in FIG. 5 and overcoated with a wear resisting layer 41 of $Ta_2O_5$. Finally semiconductor integrated circuit chips 33 are mounted on film 23 over the side surface of substrate 51 and wire-bonded with bonding wires 45.

According to the embodiment, by use of metal plate 53, film 23 is kept so flat throughout the whole process that resistance values of resistive heating layers are maintained constantly in expected values.

It is understood that the thermal print head of this invention can be formed in many shapes, for example a long and narrow rod, of heat sink substrate with a flat and planar surface. As mentioned above, the thermal print head of this invention yields precisely obtained expected resistance values of resistive heating layers while using a film with the merits of a flexible base.

What is claimed as new and desired to be secured by Letters Patent of the United States is:

1. A thermal print head comprising:
   - a heat sink substrate having a flat surface with corners extending along both sides thereof;
   - a heat resisting organic resin film sheet formed on the flat surface and folded at the corners;
   - resistive heating layers comprising a plurality of resistive heating elements deposited on an area of the film sheet on the flat surface;
   - metal circuit layers extending on the film sheet electrically connected to the resistive heating layers respectively; and
   - integrated circuits mounted on the substrate at a position spaced from said flat surface and electrically connected to the metal circuit layers,
   - wherein the resistive heating layers are kept flat supported without bending.

2. The thermal print head of claim 1 wherein the heat sink substrate comprises a flat metal plate having a flat metal surface on which said film sheet is mounted and a metal block fixed to a surface of said flat metal plate opposite said flat surface thereof.

3. The thermal print head of claim 1 wherein the film sheet is comprised of polyimide resin.

4. The thermal print head of claim 1 wherein at least the film sheet, the resistive heating layers and the metal circuit layers on the flat surface are overcoated with a wear resisting layer.

5. The thermal print head of claim 4 wherein the resistive heating layers are comprised of Ta-Si-O and the wear resisting layer is comprised of $Ta_2O_5$.

6. The thermal print head of claim 1 wherein the resistive heating layers are excluded from both folded sections of the film sheet at the corners of the heat sink substrate.

7. The thermal print head of claim 6 wherein the metal circuit layers extend through the folded sections of the film sheet.

8. The thermal print head of claim 2 wherein the film sheet intimately contacts said flat metal plate surface.

9. The thermal print head of claim 1 wherein the integrated circuit is mounted on the film sheet with the deposited resistive heating layers.

10. The thermal print head of claim 1 wherein the heat sink substrate is in the shape of a rod.

11. The thermal print head of claim 2 wherein said integrated circuit is mounted on said metal block.

* * * * *